March 3, 1970     M. FERRIS     3,497,968
TEACHING MACHINE

Filed Feb. 1, 1968     2 Sheets-Sheet 2

*INVENTOR.*
MAXIME FERRIS

BY

Agent

United States Patent Office 3,497,968
Patented Mar. 3, 1970

3,497,968
TEACHING MACHINE
Maxime Ferris, 299 Langford Place,
Waterloo, Ontario, Canada
Filed Feb. 1, 1968, Ser. No. 702,347
Int. Cl. G09b 7/00
U.S. Cl. 35—48                                    3 Claims

ABSTRACT OF THE DISCLOSURE

A teaching machine having a central console and connected thereto, an instructor's switch and a plurality of student switches. When the instructor's switch is closed, paper within the console is advanced one line and when the switch is opened a tone sounds for a predetermined period. Each student switch is connected to a separate relay within the console and when closed and while the tone sounds, activates its associated relay. When the tone stops sounding, a printing mechanism within the console makes a permanent recording of activated relays and a meter, remote from the console, displays the number of activated relays.

---

This invention relates to pedagogical devices and is particularly directed to a teaching machine.

During the course of a lesson, a teacher must frequently ascertain whether the subject matter is understood by the class. It is customary for a teacher to determine comprehension by directing questions to the class in general and requiring one pupil to answer. Such a method, however, is time consuming and embarrassing for the pupil who cannot answer the question which has been put to him. Moreover, as the teacher is attempting to determine overall comprehension by a method of random sampling, the teacher cannot be certain that the replies elicited provide an indication of the comprehension of the average.

Recently means have been devised to enable a teacher to ascertain simultaneously the response of every pupil in a class to an objective type question. Such means provide the teacher with a rapid indication of the learning rate of the entire class and thus enable the teacher to set his teaching rate accordingly. One such means, for example, comprises an instructor's console electrically connected to a number of student consoles. Each student console is provided with a number of buttons and is adapted for multiple choice testing. In operation, questions are read or displayed to the pupils and they are directed to push the button corresponding to the answer which they consider is correct. A meter on the instructor's console indicates to the teacher the number or percentage of correct answers and a printing device provides the teacher with a permanent record of the correct or incorrect responses of each pupil to the questions.

There are, however, problems associated with the known devices, chief among which is the fact that the teacher lacks precise control over the time during which the pupils must consider the question before responding. Where a teacher lacks such control, he has no way of judging how much time each student required to respond to the question. Thus, the score of a poor student could be the same as that of a good student. Where, however, a teacher can control precisely the time for consideration or cogitation, the responses which will be obtained will be much more indicative of the relative ability of each student compared to the class average. In addition, where a teacher has precise control he will be able to determine the relative worth of the questions. If, for example, a question is generally answered incorrectly, it may be a perfectly valid question but a more difficult question which should have been given more time for cogitation.

It is accordingly an object of the present invention to provide a teaching machine which permits a teacher to control precisely the time during which pupils may consider the question before they must react.

It is another object to provide a teaching machine having a motivational device in the form of a meter, visible to teacher and pupils alike, which indicates the number of positive responses to a question. The motivational device encourages self competitive as opposed to harmful combative type competition in that an individual student can compare anonymously his performance with that of the class. If the meter indicates that only one pupil was wrong, that pupil's identity is unknown to all but the teacher. The pupil suffers no embarrassment before his classmates. If, on the contrary, the meter indicates that only one pupil was correct, that particular pupil experiences all the pleasure of success and no other pupil is hurt in the process.

It is another object to provide a teaching machine which prints out the results on one sheet of paper for the entire class, the results being arranged in a series of parallel columns, each column containing the results of each student. Thus, the scoring of individual pupils is facilitated and the teacher may evaluate individual questions to upgrade the teaching.

According to the present invention, these objects can be achieved by providing, in combination, an instructor's switch, first circuit means activated by the instructor's switch, paper advancing means operable upon activation of the first circuit, second circuit means activated for a predetermined period after de-activation of the first circuit, means indicating activation of the second circuit, a plurality of student switches having on-off positions remote from the instructor's switch, third circuit means for each of the student switches, the third circuit means being operable by the student switches during activation of the second circuit, means for permanently recording on the paper activations of each of the third circuit means, and display means remote from the instructor's switch from which the number of activated third circuit means can be ascertained, the permanent recording means and the display means operable following deactivation of the second circuit.

The invention can best be understood by a brief description of the teaching sequence. The teacher and pupils will each be provided with a switch electrically connected to a central console. The teacher will ask his class a question, to which a positive or negative response is to be elicited. The pupils will have a predetermined time within which to decide how they wish to respond. At the end of the period of cogitation, the teacher will close a switch which causes a piece of paper within the printing mechanism to advance one line. Upon releasing the button, a tone will sound which is a signal to the pupils that they should respond in a positive manner, if they wish to do so, by closing their switches. The interval during which the tone sounds, called the response period, is relatively short, about two seconds. A response before or after the response period will not be recorded. The pupils who respond in a positive manner will have that fact held in a relay memory and at the end of the response interval markers energized by solenoids will mark the paper, thereby making a permanent recording of positive responses. Inasmuch as marking does not occur until after the response period, the pupils cannot ascertain how their classmates have responded by listening to the solenoids striking during the response period. After marking, the paper will not advance until the teacher has closed the switch initiating the next response period for the next question. A meter visible to both teacher and students will display the number of positive responses immediately following the response period; again, the pupils will not be able to judge the correct response by meter movement during the reponse period.

A fuller understanding of the invention may be had by referring to the following description and claims, taken in conjunction with the accompanying drawings, in which:

Like reference characters refer to like parts throughout the description of the drawings.

Figure 1:
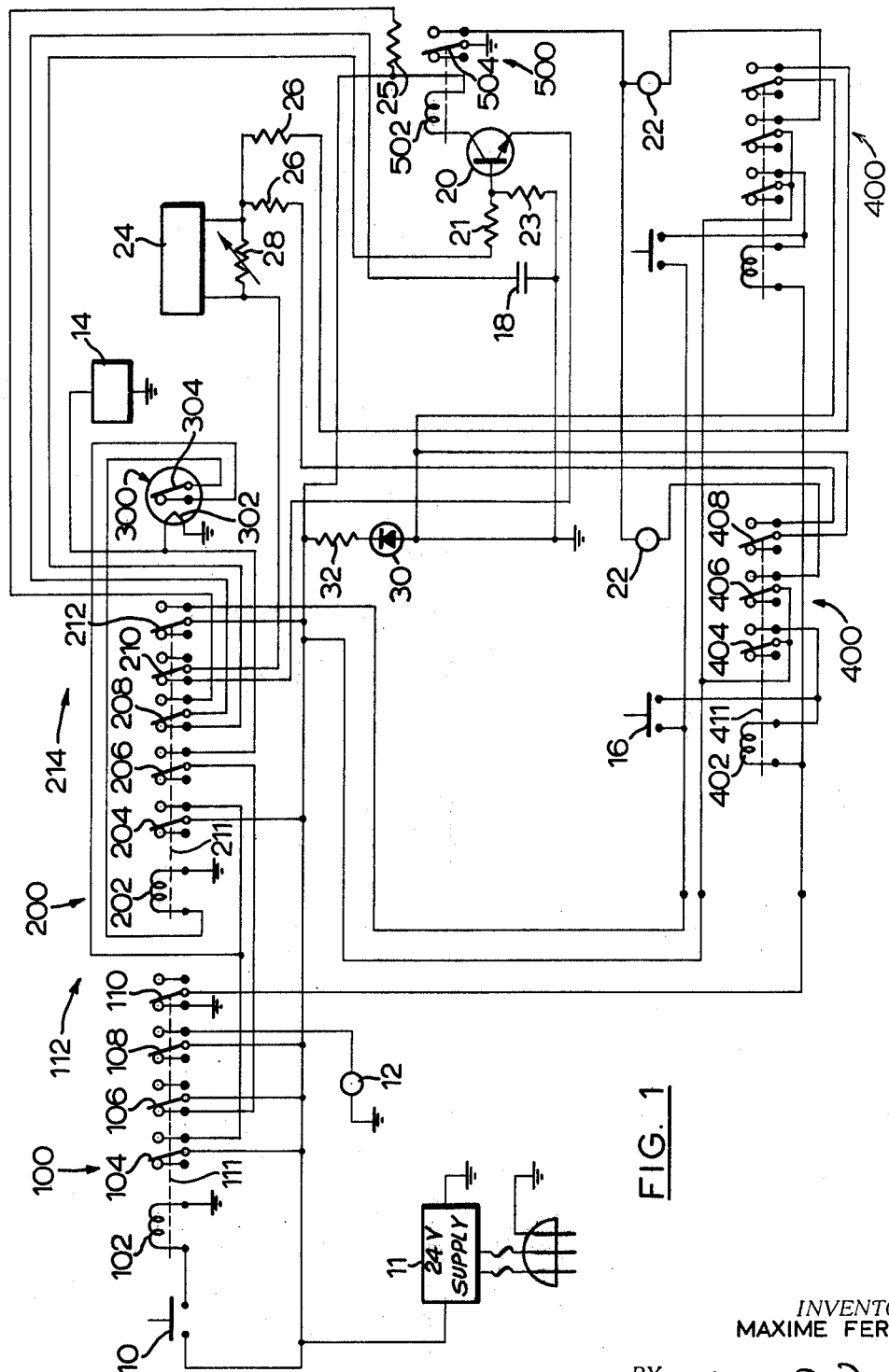
FIGURE 1 is a schematic electrical diagram of the circuit of the teaching machine.

With reference to FIGURE 1, the circuit includes 24 volt supply 11, relay 100 and switch 10 which when closed communicates voltage supply 11 to relay 100. Relay 100 comprises coil 102, an armature represented by line 111 and movable contacts 104, 106, 108 and 110 carried by armature 111. When coil 102 is energized, contacts 104, 106, 108 and 110 swing in the direction indicated by arrow 112. Energization of coil 102 also activates paper advance solenoid 12 shown schematically in FIGURE 1 and illustrated in FIGURE 3.

Relay 200 similarly comprises coil 202, armature 211 and movable contacts 204, 206, 208, 210 and 212. Energization of coil 202 urges contacts 204, 206, 208, 210 and 212 to swing in the direction indicated by arrow 214. When coil 202 is energized, oscillator 14 is activated via contact 206 and contact 106 of deactivated coil 102.

Connected to relays 200 and 100 via contacts 206 and 106 is heater 302 of thermal delay relay 300. Contact 304 provides a path via contact 104 to energize coil 202 of relay 200 before completion of the thermal delay of heater 302.

Figure 2:
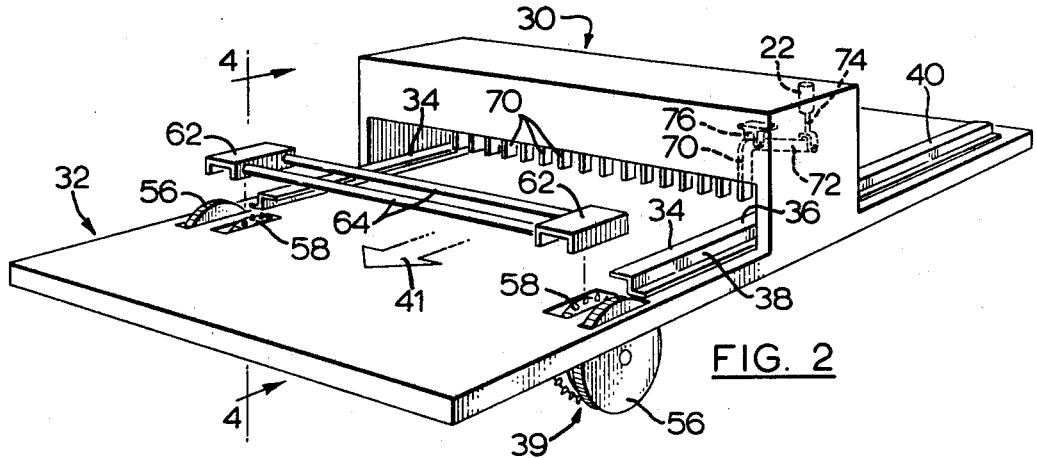
FIGURE 2 is a perspective view of the printing means.

A plurality of student relays 400 are connected in parallel to the circuit. For purposes of illustration, two student relays 400 have been shown in FIGURE 1 and the material elements of one numbered. Student relays 400 are activated by student switches 16 which energize coils 402 via contact 212 of activated relay 200 and contact 110 of de-activated relay 100. Meter 24 is connected to relays 400 via resistors 26 and is energized when relays 400 are actuated. Meter 24 may be adjusted by means of variable resistor 28. Solenoids 22, one of which is shown in FIGURE 2, are shown schematically in FIGURE 1. Solenoids 22 are energized when paths thereto are completed via relays 400 and relay 500.

Relay 500 comprises coil 502 and contact 504. Coil 502 is connected to the collector of transistor 20. Connected to one branch of the base circuit of transistor 20 are condenser 18 and resistor 23 and connected to another branch is resistor 21. The base is also grounded via resistor 23. Connected in parallel to the base circuit is Zener reference diode 30 and resistor 32.

In operation, at the end of the period for cogitation, the instructor closes switch 10 momentarily which closes the circuit through coil 102 of relay 100. The results from energization of coil 102 are as follows:

(1) Contact 108 closes to communicate solenoid 12 with 24 volt supply 11. Solenoid 12 when energized advances the paper one line in a manner explained below with reference to FIGURE 3.

(2) Contact 110 is opened to break the energizing circuit of coil 402 of relay 400 thereby clearing all relays previously activated by student switches 16, as will be discussed below.

(3) Coil 202 of relay 200 will be energized by the closing of contact 104 via normally-closed contact 304 of thermal delay relay 300. Energization of coil 202 will urge contacts 204, 206, 208, 210, and 212 carried by the armature designated by line 211 in the direction indicated by arrow 214 and coil 202 will then be energized via closed contacts 204 and 304 to ground.

When switch 10 is opened to de-energize coil 102 and return contacts 104, 106, 108 and 110 to their normal positions, the circuits through oscillator 14 and heater 302 of thermal delay relay 300 will be completed via closed contact 206 and contact 106. Oscillator 14 will sound until switch 304 opens following the thermal delay of relay 300. If students wish to respond positively, they must do so while oscillator 14 sounds. The students respond positively by closing switches 16 which energizes coil 402 via contact 212 of energized relay 200 and contact 110 of de-energized relay 100. When coil 402 is energized, it becomes locked through armature 404 and remains so until switch 10 is closed, as explained above. While relay 200 is activated the circuit to condenser 18 is completed via armature 208.

Upon completion of the thermal delay of relay 300, contact 304 opens, thereby de-activating oscillator 14 and relay 200. Thus when the circuit is broken, it is too late for students to have a response recorded positively, inasmuch as contact 212 opens upon de-activation of relay 200. Condenser 18 energizes the base circuit of transistor 20 via armature 208 of de-activated relay 200. Transistor 20 conducts while the voltage of capacitor 18 exceeds the emitter reference voltage and coil 502 of relay 500 is energized. The closing of relay 500 completes the circuit through solenoids 22 via contacts 406 provided relays 400 were activated by pupils during the response period. Activation of solenoids 22 causes marking rods 70 (shown in FIGURE 2) to make an impression on a paper. Relay 500 is provided to complete the circuits of solenoids 22 for a short period of time and thereby reduce the power requirements of the power supply. Provided one or more student relays 400 are activated, and while transistor 20 conducts, the circuit to meter 24 will be completed via contact 210 and transistor 20. The current through meter 24 will indicate the number of resistors 26 connected in parallel via closed contacts 408 and therefore indicate the number of positive responses.

When the voltage of capacitor 18 falls below the reference value, relay 500 opens and no further operations occur until switch 10 is again closed.

FIGURE 2 illustrates printing mechanism 30 and deck 32 across which the paper travels. Fastened to deck 32 are guides 34 having horizontal limbs 36 and vertical limbs 38.

Figure 3:
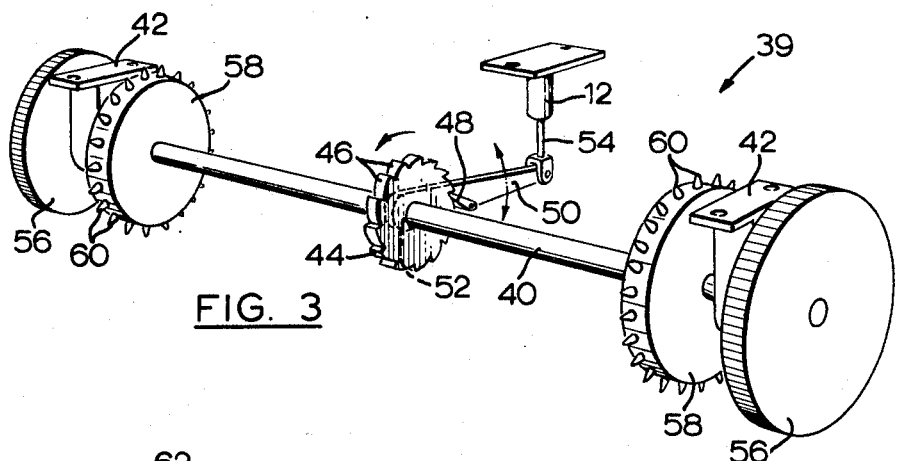
FIGURE 3 shows details of the paper advance mechanism in elevation.
Figure 4:
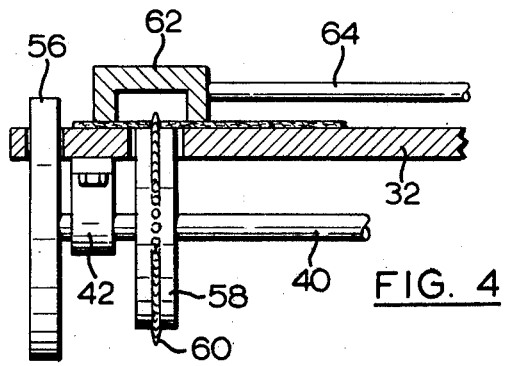
FIGURE 4 is a view along the line 4—4 of FIGURE 2.

Mounted beneath deck 32 at one end is paper advance mechanism generally indicated by the numeral 39. As shown in FIGURES 3 and 4, paper advance mechanism 39 has a shaft 40. Shaft 40 is journalled in supports 42, supports 42 being fastened to the lower surface of deck 32. Attached midway of the ends of shaft 40 is ratchet wheel 44 having teeth 46 into which pawl 48 fits. Pawl 48 is fastened to lever 50 which is pivotally attached to shaft 40 at pivot 52 and also pivotally attached to plunger 54 of solenoid 12. Solenoid 12 is adapted to be fastened to the lower surface of deck 32.

Attached near both ends of shaft 40 are knurled nobs 56 and disposed between each knurled nob 56 and ratchet wheel 44 on shaft 40 are gear wheels 58 having cogs 60. The upper portions of knurled nobs 56 and cogs 60 of gear wheels 58 project above the upper surface of deck 32 is illustrated in FIGURES 2 and 4.

In operation, paper to be marked is inserted between vertical limbs 38 and under horizontal limbs 36 at ends 40 of guides 34 and is moved by hand in the direction indicated by arrow 41 beneath printing mechanism 30 to contact cogs 60 of gear wheels 58. A plurality of holes are provided in the paper. The holes are arranged in a row parallel to both sides of the paper and spaced so that as shaft 40 rotates, adjacent cogs 60 will enter adjacent holes to advance the paper. Knurled nob 56 is provided to permit the paper to be advanced rapidly before and after the teaching operation.

When solenoid 12 is energized by button 10, plunger 54 is pulled upward into the solenoid coil and lever 50 is pivoted upward about pivot 52. Pawl 48 attached to lever 50 also moves upward engaging a tooth 46 of ratchet wheel 44 and rotating shaft 40 and gear wheels 58. The paper engaged by cogs 60 will be advanced as shaft 40 rotates, the amount corresponding to one row scored off on the paper.

U-shaped pressure pads 62 rest on deck 32 and straddle gear wheels 58 as shown in FIGURES 2 and 4. Pressure pads 62 are provided to hold the paper firmly down and in engagement with cogs 60. Pressure pads 62 are interconnected by means of rods 64 to facilitate the simple removal and replacement during loading of paper.

Printing mechanism 30 comprises an equal number of marking rods 70, levers 72 and solenoids 22, the number corresponding to the number of student switches 16. Solenoid 22 is positioned so that when energized, plunger 74 retracts upwardly. Lever 72 is pivotally attached to fixed fulcrum 76, plunger 74 and marking rods 70. When solenoid 22 is energized, plunger 74 retracts and marking rods 70 move downwardly to make an impression on the paper.

Thus it will be evident that marks on the paper will be arranged in rows and columns, each row corresponding to a separate question, and each column showing the results of each student. By means of a marking mask, an entire class of students can be graded in a very short time without the necessity of an optical scanner or other device.

It will be understood, of course, that modifications can be made in the invention described and illustrated herein without departing from the scope and purview of the appended claims.

What I claim as new and desire to protect by Letters Patent of the United States is:

1. A teaching machine comprising an instructor's switch, first circuit means activated by said instructor's switch; record paper advancing means for incrementally advancing a record, paper and operable upon activation of said first circuit means to advance said record paper an increment; second circuit means activated for a predetermined period after de-activation of said first circuit means; means indicating activation of said second circuit; a plurality of student switches having on-off positions remote from said instructor's switch, one switch being provided for each student; third circuit means for each said students' switch, said third circuit means being selectively actuatable by said student switches, means limiting actuation of said third circuit means to the predetermined period during which said second circuit means is activated; means for permanently recording on said record paper, activation of each of said third circuit means; and display means remote from said instructor's switch from which the number of activated third circuit means can be ascertained, said permanent recording means and said display means operable following de-activation of said second circuit means.

2. A teaching machine comprising and an instructor's switch; a record paper advancing means for incrementally advancing a record paper, said record paper advancing means being electrically connected to said instructor's switch and activated by closing said instructor's switch to advance said record paper by an increment; a tone oscillator, delay means responsive to the opening of said instructor's switch to maintain said tone oscillator activated for a predetermined period; a meter; a plurality of student switches, one switch being provided for each student; a printing mechanism having a plurality of markers, said markers making a permanent record on said record paper as it is advanced incrementally through said printing mechanism, each said marker electrically connected to each said student switch, each said student switch when closed activating each said marker and said meter, said meter indicating the number of closed student switches, and means electrically connected to said delay means for limiting activation of said markers to the predetermined period during which said tone oscillator is activated.

3. A teaching machine as claimed in claim 2 wherein said permanent recording takes the form of a series of marks on said record paper, said marks being arranged in columns parallel to the direction of advance of said record paper through said printing mechanism and rows arranged at right angles to said advance, the number of columns corresponding to the number of student switches and the number of rows corresponding to the number of separate advances produced by said record paper advancing means.

References Cited

UNITED STATES PATENTS

| | | | |
|---|---|---|---|
| 3,300,876 | 1/1967 | Johannsen | 35—48 |
| 3,399,469 | 9/1968 | Nisbet | 35—48 |
| 3,416,242 | 12/1968 | Nisbet | 35—48 |
| 3,416,243 | 12/1968 | Greenberg et al. | 35—48 |

EUGENE R. CAPOZIO, Primary Examiner

W. W. NIELSEN, Assistant Examiner